April 15, 1969  H. ROHLING  3,438,575
ROOT CONTROLLED WATERING DEVICE
Filed May 24, 1967
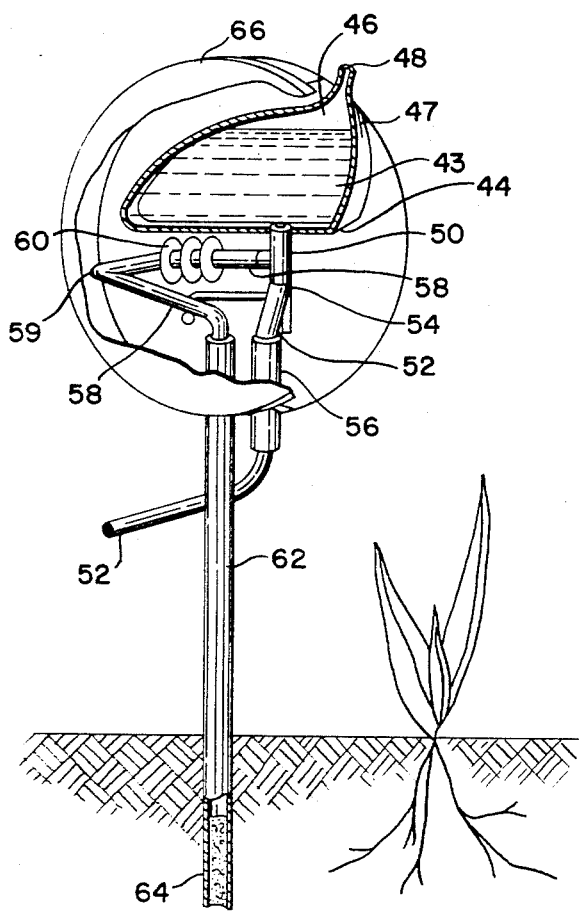
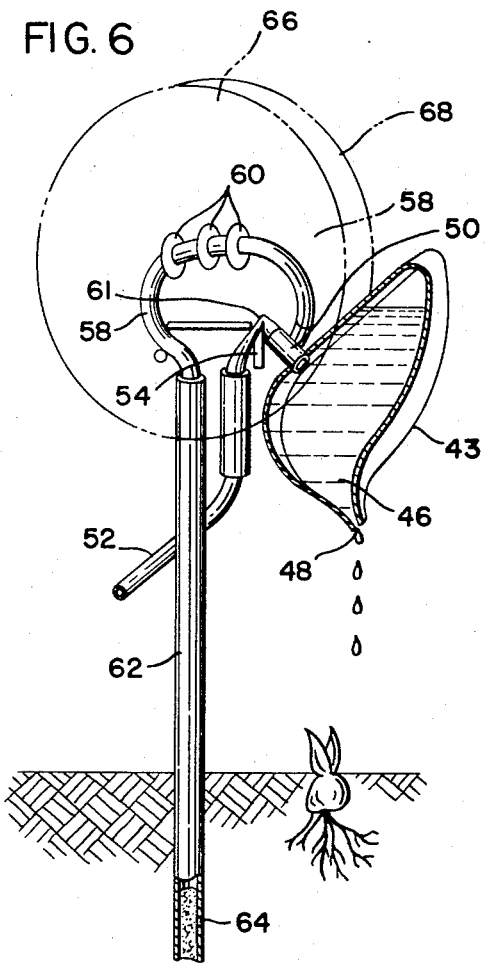
INVENTOR.
HERMANN ROHLING
BY
Fay, Sharpe & Mulholland
ATTORNEYS

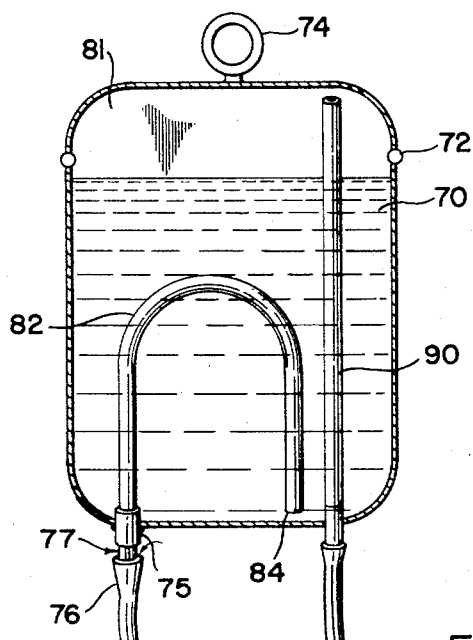
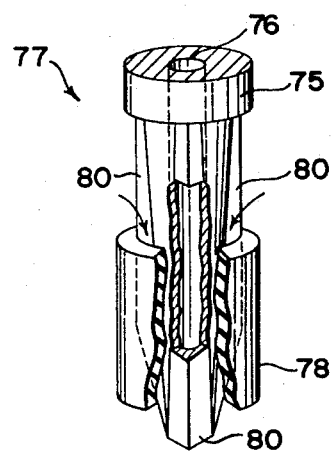
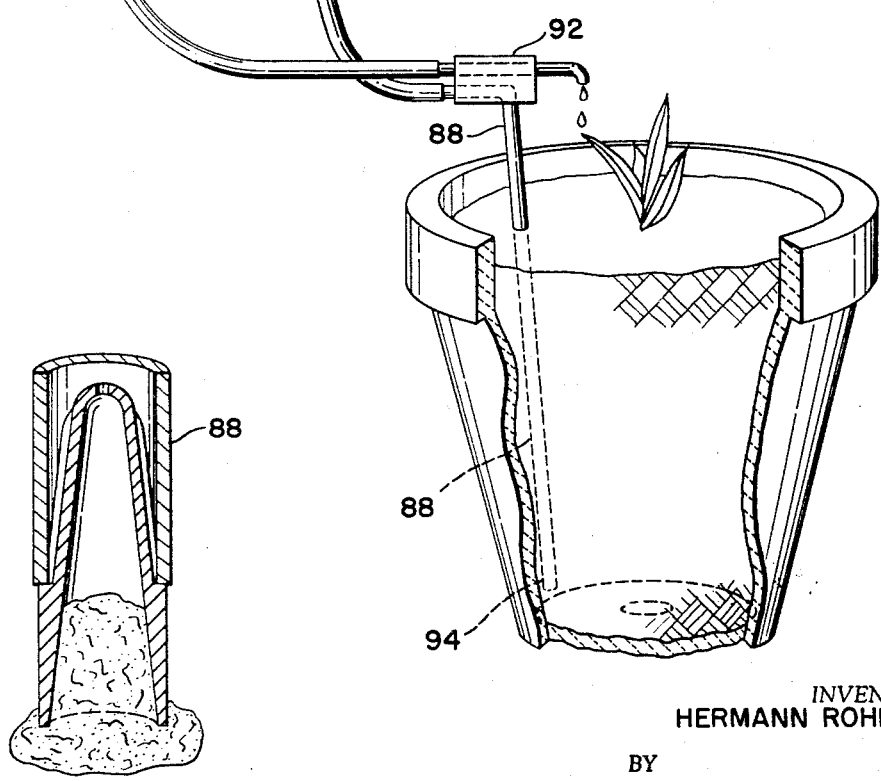
FIG. 7
FIG. 8
FIG. 9

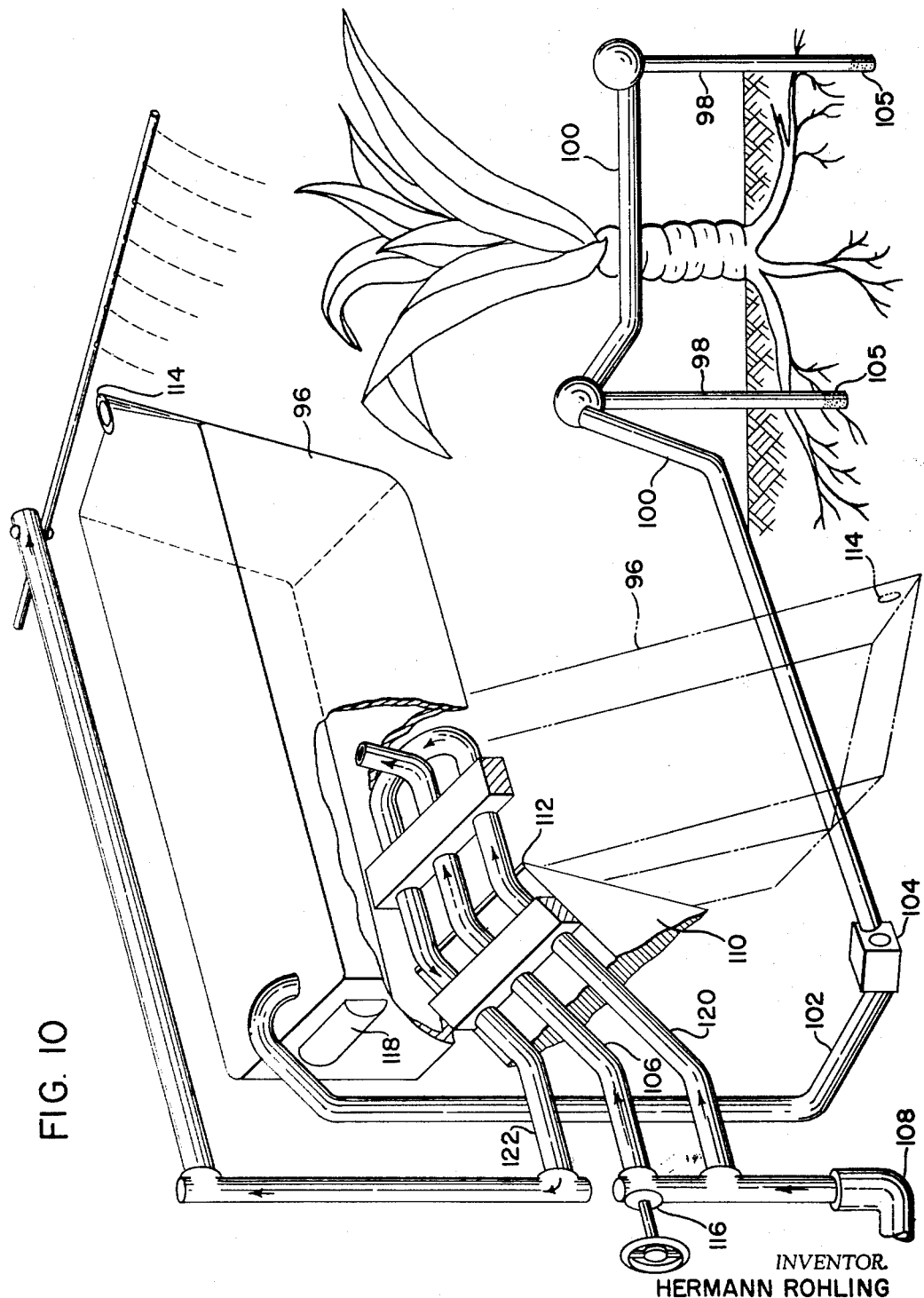

:::

United States Patent Office 3,438,575
Patented Apr. 15, 1969

3,438,575
ROOT CONTROLLED WATERING DEVICE
Hermann Rohling, 7 Kurzberg,
8961 Oberdorf, Germany
Filed May 24, 1967, Ser. No. 640,999
Int. Cl. A01g *27/00, 25/00;* B05b *17/00*
U.S. Cl. 239—1                          9 Claims

ABSTRACT OF THE DISCLOSURE

An above ground plant watering device having a water reservoir mounted for tilting to dispense water on plants responsive to a subsoil located moisture control located adjacent the plants and including a porous moss which on drying permits air to enter the reservoir thereby permitting the watering action.

---

There is more to irrigating growing plants than just "watering" them. In addition to securing adequate supplies of water, one of the main problems is establishing "how much" water plants actually need and should receive so they will have enough available moisture for normal growth, development and maturation. As is well known, too little water—or too much for that matter—can be harmful and even damaging to plants.

The automatic watering system disclosed and described in this application helps overcome this perplexing problem. This is a fully automatic watering system which supplies water on demand by the plants and only when required. This watering system allows water to flow from a tilting reservoir to the roots of a plant when the roots "signal" that they need water.

When the roots have enough water, the system shuts itself off until it receives another signal for more water. Water flows only on demand, and only when needed.

One of the most significant advantages of this watering system is that it automatically compensates for varying growing conditions. Thus it supplies water when needed by the plants regardless of ambient temperature, or temperature fluctuation or rate of evaporation, or frequency or intensity of natural precipitation, or length of drought. It always makes sure the plants never "run out" of available moisture.

This invention relates to watering devices in general and more specifically to watering devices which operate on the demand principle.

Supplying moisture to growing plants by artificial means—irrigation—is indeed an old and well known art. Elaborate irrigation systems were used by the Babylonians and Egyptians. The Romans are known to have designed and constructed some of the most intricate and complicated ditch and viaduct irrigation systems known to mankind.

Irrigation is of course used the world over and quite extensively in this country, especially in the areas where rainfall is scarce, unpredicatable or simply not available. Indeed, millions of acres of arable, cultivated land are irrigated annually in the United States to insure adequate available moisture for the proper growth and maturation of the nation's crops.

Even where crops are irrigated, farmers are still faced with a perplexing and usually expensive dilemma: under-irrigation or possible over-irrigation. It is well established that lack of adequate moisture supply can be damaging, harmful and often fatal to crops. On the other hand, moisture can cause plants to rot, again resulting in crop failure. Furthermore, even when such damage does not occur, the cost of providing excess moisture needlessly above and beyond that required for growth is obviously wasteful and unnecessarily costly.

Thus, one of the major problems agriculturists who use irrigation to supplement rainfall have always recognized during the crop growing season is the lack of reliable means for determining with reasonable certainty and accuracy when the available moisture in the soil has reached a critical, low level which would require moisture replenishment.

It is well estatblished that visual inspection of the "dryness" of the soil surface is totally deceiving and unreliable in determining the moisture content beneath the soil surface. It is impossible to tell by visual observation whether plant roots have access to an adequate supply of moisture. It is, indeed, well known that the *apparent* moisture condition of the soil surface usually does not reflect the *actual* moisture condition at any depth *below* the surface of the soil. It has often happened, for instance, that where the surface of the soil appeared "bone dry" the amount of available moisture to the roots of the plants was amply adequate not only to sustain plant life, but to support relatively normal growth and development of the plants. Finally it is also well established that even "feeling" the condition of the surface soil in one's hand is deceiving, and it is exceedingly difficult to establish *positively* whether or not there is enough available moisture at the *root level.*

It must also be remembered that different plants have different root patterns and systems. The root system of some plants is relatively shallow and most of the roots develop near the surface of the soil. In other plants, such as alfalfa, for example, root systems are known to have penetrated the soil in search of moisture to depths exceeding fifteen feet.

Many methods have been devised in an attempt to provide some reliable gage or yardstick which would permit a farmer, gardener or even hobbyist to make certain that his crops or plants are adequately supplied with available moisture *at all times.*

For instance, some keep accurate weather records which tell the amount of precipitation, intensity and frequency falling in a specific area. By comparing this data against the amount of moisture certain plants should have at given times during the growing season, it is possible to approximate how much additional moisture—if any— shall be provided.

This method obviously has several serious drawbacks, one of the most intricate being evaporation. The latter is exceedingly complex to measure and it is extremely difficult—if not impossible—for a grower, be he a farmer, gardener or hobbyist, to relate evaporation to available moisture for plants. Evaporation is, of course, affected and influenced not only by heat and sunshine, but the wind as well.

Another method used for determining the moisture requirement of plants is by means of so called "moisture blocks." These are small plaster of Paris blocks into which two electrical leads have been imbedded during block molding. The "moisture blocks" or moisture probes are then buried at various depths in the soil of a field or garden. The two terminals are left protruding above the surface of the soil and usually affixed to a white stake so they can easily be spotted in the field. After the blocks are buried (at the beginning of a growing season) one must measure periodically the electrical conductivity of the blocks and preferably do so at regular intervals to determine whether irrigation is required. During the critical growing periods this may be as often as once a day. When the blocks are moist (and conductive) they reflect the fact that there is moisture underground at that particular subsurface level. When they are dry (and less conductive) the meter reading is proportionally less. By comparing the meter reading of the moisture blocks buried at various depths against appropriate moisture charts, it is possible to determine whether or not irrigation is needed.

This moisture checking procedure, while reasonably reliable when the blocks are new, becomes increasingly less reliable as the plaster of Paris gradually deteriorates, sometimes causing the lead terminals to touch and reflect erroneous moisture conditions. Another important disadvantage is that where large acreages are involved, the method of checking moisture availability becomes exceedingly time-consuming and impractical. Finally, it is necessary at the end of the growing season to dig up the blocks and store them until the following growing season when they are again reburied.

With the foregoing problems in mind, a far simpler and more reliable method of insuring adequate moisture supply to growing plants is proposed by the applicant. This method can be used in a wide variety of plant growing environments. Furthermore it does not matter whether the plants are grown indoors or outdoors. The applicant's invention is equally adaptable and practicable regardless whether the user wants to supply moisture to a single plant, in a flower pot kept indoors or whether he wishes to irrigate many acres.

It is an object of this invention to provide a fully automatic watering system.

It is another object of this invention to provide an automatic watering system which supplies water on demand, and only when required.

It is a further object of this invention to provide an automatic watering system which will stop the flow of water when moisture in the soil has reached a predetermined level.

It is a further object of this invention to provide an automatic watering system which is so versatile and adaptable that it can be used to supply moisture to a single plant in a flower pot (indoors or outdoors) or for an entire field for large scale irrigation of crops.

It is another object of this invention to provide a watering system which, even though it can stop the flow of water on demand, does not require that the main supply of water be shut off at any time. This is an important feature because it insures that water is always available for irrigation purposes (day or night) and when needed.

In the drawings:

FIGURE 5 is a watering device with the water reservoir in a nonwater-dispensing position, wherein the counterweight mechanism is built into an air hose.

FIGURE 6 shows the design illustrated in FIGURE 5 wherein the water reservoir is tipped to dispense water to plants.

FIGURE 7 illustrates a variation of the watering device using a collapsible reservoir contained within a rigid housing.

FIGURE 8 is a funnel-shaped, air vented adaptor for use with the watering device illustrated in FIGURE 7.

FIGURE 9 is a detailed view of the bottom portion of the moisture sensing probe illustrated in FIGURE 7.

FIGURE 10 illustrates a manifold arrangement of the watering device.

Figure 1:
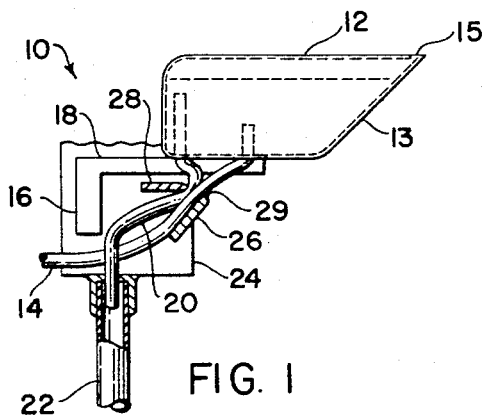
FIGURE 1 shows the watering device with the water reservoir in an upright or nonfilled position wherein a counterweight uprighting mechanism is connected to the reservoir.
Figure 2:
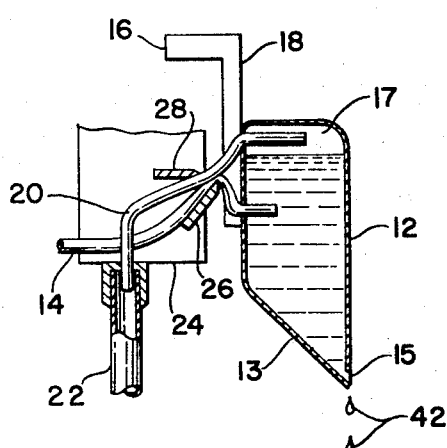
FIGURE 2 represents the watering device of FIGURE 1 with the water reservoir partially filled and in a tipped or water-dispensing position.

The watering device shown generally at 10, FIGURE 1, is in an upright nonfilled or nonwater-dispensing position. A tiltable water reservoir 12 has an outside source of water supply connected thereto by means of a flexible conduit such as a hose 14. An uprighting counterweight 16 is connected to the reservoir 12 by means of a member 18. The said counterweight 16 can be of any suitable material such as, for instance, rock or metal. The water reservoir 12 can be of square or rectangular cross section as illustrated in FIGURES 1 and 2, although as shown in FIGURES 5, 6 and 7 it can be of any suitable shape. Again, referring to FIGURE 1, the cross section of the reservoir is generally square during a portion of its length. It then tapers inwardly and upwardly to form a generally narrower funnel-like portion 12 adapted with a small opening 15.

Another flexible conduit 20 is also connected to the water reservoir but farther away from the opening 15 than is the flexible hose 14. The opposite end of conduit 20 is connected to a hollow air tube 22 which acts as a moisture probe and which is supported by a structure 24.

Figure 3:
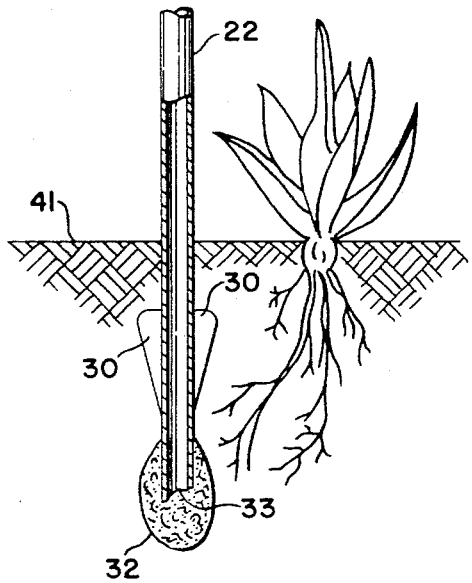
FIGURE 3 illustrates a straight, vertically-disposed moisture sensing probe.

The structure 24 also supports two pinching members 26 and 28 which are disposed in angular relationship to one another and in such a manner as to allow enough space therebetween to accommodate the said conduits 14 and 20. As will be seen, the spacing and positioning of the pinching members 26 and 28 is most critical. The member 26 serves a dual purpose: it acts as both a pinching member, and its foremost edge 29 also acts as a pivot. The moisture probe 22, now viewing FIGURE 3, is of appropriate height (depending on the growth pattern of the plants for which its use is intended), and adapted near its foremost lower extremity with two web-like stabilizing fins 30.

Below the stabilizing fins 30 is a porous breather material 32, such as for instance, peat moss, which covers the opening 33 in the end of tube 22.

Figure 4:
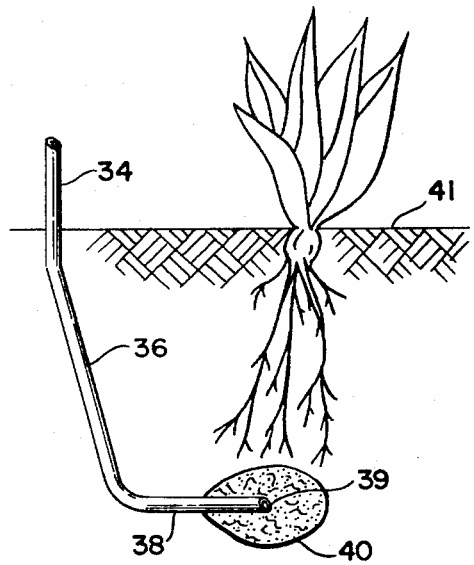
FIGURE 4 shows an angular moisture sensing probe.

FIGURE 4 illustrates a variation of the design of the moisture probe. In FIGURE 3 the hollow tube 22 is shown as being straight, disposed vertically and having no bends. In FIGURE 4, the moisture probe 34 is shown with two bends although this need not be a limiting number. Portion 36 of probe tube 34 is shown at a slight angle with respect to the vertical portion of the probe tube 34, terminating in a portion 38, which can, as shown, but which need not necessarily, be horizontal and perpendicular to the tube 34. At its foremost extremity, the tube 34 is adapted with a porous breather covering the end 39 of the tube 34. When the probe tube is inserted in the soil, the breather 40 should be buried near the bottom and center of a plant's root system as shown in FIGURES 3 and 4.

In operation FIGURE 1, when irrigation fluid which most usually would be water (or water mixed with a chemical such as a fertilizer for instance) is allowed into the hose 14, the fluid flows through the said hose into the reservoir 12. Note that in FIGURE 1, when the counterweight 16 holds the reservoir 12 in its generally horizontal or empty position, the flexible conduits 14 and 20 are so disposed between the pinching members 26 and 28 that conduit 14, which is connected to the supply of water is *open* and conduit 20, which is connected to the hollow tube of the moisture probe 22, is pinched *shut*. This arrangement permits water to flow freely into the reservoir to fill it. Air displaced in the reservoir vents through the small opening 15.

When the mass of water in the reservoir and the weight of the reservoir overhanging the pivot edge 29 which is formed by the extremity of pinching member 26 exceeds the mass of the counterweight 16, the reservoir assembly tips over about the pivot edge 29 as shown in FIGURE 2. This is the water-dispensing position of the device. Note that the pinching member 26 has now pinched the water hose 14 shut, FIGURE 2, while the air hose 20 is open and provides a continuous passage between the air chamber 17 in the reservoir at one end, and the hollow air tube of the moisture probe at the other end. A small quantity of water escapes at first through the small opening 15 creating a partial vacuum inside the reservoir at 17 and water flow stops.

As moisture evaporates from the soil 41, FIGURE 3, air gradually displaces water in the soil interstices and eventually the moisture level drops below the level of the opening 33, at the foremost end of the hollow air tube 22.

When this happens, it is obvious that air has displaced moisture in the soil and the openings in the porous breather 32. Since the breather 32 was initially buried near the bottom of the root system, it follows that the roots too have no longer access to moisture. Air can now percolate through the porous breather into the air tube 22 of the moisture probe and the air hose 20.

As air enters the chamber 17 in the reservoir 12 it temporarily breaks the partial vacuum in the reservoir and allows some water, FIGURE 2, to escape from the reservoir and fall onto the soil, 41. When enough moisture has fallen to fill the interstices in the soil in the area of the plant roots, the moisture level rises. When the moisture level rises above the opening 33, it blocks the passage of air into the air tube. The partial vacuum created inside the reservoir 12 again stops water flow. As moisture is depleted and supplied the stop-flow-stop process is repeated supplying or stopping the flow of water to the plant roots on demand.

It is obvious that ultimately all or most of the water in the reservoir will have flowed out of it, and at the moment the mass of the counterweight 16 will tip the reservoir back into a generally horizontal position, as shown in FIGURE 1. Note that immediately the pinching member 28 blocks the air passage in air hose 20, while at the same time water hose 14 moves away from the pinching member 26, again allowing water to flow freely into the reservoir 12. Again, when the reservoir fills and the mass of the water exceeds that of the counterweight 16, the reservoir assembly 12 will tip over, again ready to supply water to the plant roots on demand.

The same operating principles apply to the moisture probe 40 in FIGURE 4 as to those in the moisture probe 22 in FIGURE 3.

A variation of this design is shown in FIGURES 5 and 6. FIGURE 5 shows the device in the nonwatering position. FIGURE 6 shows the device with the reservoir tipped in the watering position. In FIGURE 5, a reservoir has a broad base 44 which terminates into a narrowed, necked down, funnel-like portion 46 toward the top of the reservoir. This narrower portion is adapted with a slit 47 and a small opening 48. One end of the cross-bar portion of a T-connector 50, or the like, is connected to an opening in the base of the reservoir. The other end of the cross-bar converts to a water hose 52, which is partially surrounded by a protective member 56. To the leg of the T which is perpendicular to the cross-bar is connected an air hose 58 to which are attached an appropriate number of counterweights 60. The opposite end of the air hose 58 is connected to a hollow air tube 62. A member 54 fulfills a dual purpose: it serves to pinch off the hose 52 and provides a pivot edge for the reservoir.

The operation of this watering device is similar in character to that described with respect to FIGURES 1 and 2. After the water which enters through water tube 52 has filled the water reservoir 43, the said reservoir tips forward about pivot edge 54, pinching the water hose 52 over the said member 54. Note that while the reservoir is filling as in FIGURE 5, the air hose is pinched shut as visible at 59.

After the reservoir tips over, the air hose opens while the water hose becomes pinched shut as shown at 61. As in FIGURE 2, a partial vacuum is formed in the reservoir which vacuum is broken periodically by any air which can pass through a porous breather such as 64, up through the air tube 62 of the moisture probe into the air hose 58 and finally into the reservoir back, blocking the air hose and opening the water hose for refilling as in FIGURE 5. FIGURES 5 and 6 show the watering mechanism contained in an appropriate shielding cover 66 adapted with a swing-opening 68 which provides clearance for the funnel-shaped member 46 to swing over into a water-dispensing position.

The basic principles of this invention can also be adapted for use with sources of water supply other than a continuous source of water supply as described in FIGURES 1 through 6.

FIGURE 7 shows another variation of the basic design concept. This variation is more readily adaptable for the in-the-home or office use where the source of water supply can be independent of say, tap water.

In FIGURE 7, a collapsible reservoir 70, such as for instance a plastic bag is filled with water, the said bag being contained within a rigid protective enclosure 72 suspended by some convenient means such as a hook 74.

To maintain air pressure at a minimum and keep it independent of any necessary pressure-head the reservoir can be hung in some convenient place. Water flows out of the container through opening 75 through an adapter 77 into the water hose 78. The adapter 77, FIGURE 8, has radial fins 80 with sufficient clearance therebetween to draw in air. Pressure is also controlled by an inverted, U-shaped conduit 82 which is connected to opening 75 at one end and whose opposite end 84 terminates near the bottom of the reservoir but in slightly higher relationship with respect to the opening 76. The reservoir should be filled so it covers the U-shaped conduit 82.

An air hose 86 is connected at its top end to the reservoir 72 and at the bottom end to a hollow moisture probe air tube 88. The top end of the air hose 86 is connected to an internal standpipe 90 which permits air entering at the bottom of the tube 88 to rise and disturb momentarily the partial vacuum in an air chamber 81. For convenience, a common hose holder 92 can accommodate the water hose 78 and the air tube 88. The operation of the this design variation is identical to that described with respect to FIGURES 1 through 4. The only exception being the need for some gage to indicate when the reservoir needs refilling.

The basic concept of the invention is by no means limited to single-unit installations as described above. FIGURE 10 illustrates a method of manifolding two or more watering devices to enable one main watering system to supply moisture to a multiplicity of watering stations.

A reservoir 96, FIGURE 10, is connected to a multiplicity of hollow air tubes 98 by means of air hose such as 100 and 102 which are interconnected by a manifold member 104. The bottom portions of air tubes 98 are adapted with porous breathers such as 105. A main 108 supplies water into the reservoir 96 through a water hose 106 and a control valve 116. When the mass of water in the reservoir overcomes the mass of a counterweight 118, the reservoir pivots about a member 110 which is adapted with a pinching pivot edge 112. When the reservoir is tipped and in the water-dispensing position it assumes the position shown in dashed lines. Water escapes from the reservoir through a small opening 114, when the partial vacuum in the reservoir is temporarily broken by air travelling through the hollow air tubes 98 and air hose 100 and 102.

The device in FIGURE 10 provides the plants with a supply of water on demand. At the same time the said device can control the flow of water to an auxiliary sprinkling system. As shown in FIGURE 10, when the reservoir is in the water position, the hose supply line 106 is pinched as is auxiliary hose 120 which can be connected to supply an auxiliary watering system such as a sprinkling system. However, when the reservoir is being filled, the hose 120 is open and can allow water to flow to a sprinkling system which the reservoir is filling. Again, the procedure of water and air movement in the soil interstices and the porous breather is similar to that described with respect to FIGURES 1 through 4.

I claim:
1. A root-controlled plant watering device comprising in combination an air-tight reservoir, said reservoir being disposed generally horizontally and having top, bottom and side sections, the said reservoir being adapted at one end with a generally upward pointing, funnel-shaped portion having a small opening at the narrowest point of the funnel-shaped end, the said reservoir farthest removed from the end having the funnel-shaped portion, the said reservoir having two port connections along its bottom section, the first port being for the passage of water, the second port being for the passage of air, a support structure to which are attached two pinching members, the first of the said pinching members being disposed horizontally, the second pinching member being disposed at an appropriate angle with respect to the first pinching member to permit the two to form a generally V-shaped configuration, the apex end of such V-shaped configuration pointing in the direction of the funnel-shaped end of the reservoir, the apex end of the V-shape being partly open, the said support structure having means for connecting it securely to a generally vertically disposed hollow air tube, two flexible conduits, the first of the said flexible conduits being connected to the water passage port in the reservoir at one end to a supply of water at the opposite end, the two flexible conduits being disposed within the V-shaped configuration formed by the two pinching members in such a manner as to fit snugly in the opening formed by the extremities of the pinching members at the apex end of the V.

2. The root-controlled watering device of claim 1, wherein the bottom end of the hollow air tube is adapted with a porous breather material.

3. The root-controlled watering device of claim 1, wherein the reservoir is disposed above the two pinching members so as to allow counterweight to hold the reservoir in a generally horizontal position when the said reservoir is empty, so that the air hose is pinched shut and the water hose is open.

4. The root-controlled watering device of claim 1 wherein the counterweight is disposed in such a manner as to allow the reservoir when it is filled to pivot and tip into a generally vertically-disposed, water-dispensing position wherein the water hose is pinched shut and the air hose is open.

5. A root-controlled plant watering device comprising in combination an air-tight reservoir, said reservoir being disposed generally horizontally and having top, bottom and side sections, the said reservoir being adapted at one end with a generally upward pointing, funnel-shaped portion terminating in a small opening, the said reservoir being adapted with one port connection along its bottom section, a pinching member having a pivot edge disposed in a vertical plane, a T-shaped connector, one end of the cross-bar thereof being connected to the port connection in the bottom section of the reservoir, the opposite end of the cross bar of the said T-connector being connected to the port connection in the bottom section of the reservoir, the opposite end of the cross bar of the said T-connector being connected to a water hose supported in part within a rigid support sleeve, the opposite end of the said water hose being connected to a source of water supply, the said water hose being disposed in close proximity with respect to the vertically disposed pinching member, the perpendicular leg of the T-shaped connector being attached to a flexible air hose which is connected to a hollow, vertically disposed air tube, the said flexible air hose having counterweights mounted thereon.

6. A method of providing root-controlled, on demand watering of plants wherein the flexible conduit for water passage of claim 1 is connected to a source of water supply, the said conduit permitting water to flow into the said reservoir, filling it with water until the mass of water overcomes the balancing force exerted by the counterweight, causing the reservoir to pivot and tip by bending the two conduits about the lower of the two pinching members at the apex end of the V-shape, such pivoting acton causing the water conduit to be pinched shut and opening the air flexible conduit to passage of air therethrough, permitting the funnel-shaped portion to point downward and swing the device in a vertical water-dispensing position, the air-tight reservoir creating a partial vacuum within the reservoir preventing water from escaping therefrom.

7. The method of providing root-controlled, on-demand watering of plants of claim 5 wherein the hollow air tube is placed in a generally vertical position in the soil wherein plants are growing, the porous breather material at the bottom end of the hollow air tube permitting air in the soil to pass through the hollow air tube into the air hose, disrupting mementarily the partial vacuum in the reservoir and allowing only as much water to escape from the reservoir as volume was displaced by air entering through the air hose.

8. The method of providing root-controlled, on-demand watering of plants of claim 6, wherein as the level of moisture in the soil rises above the porous breather material, the passage of air into the hollow air tube is blocked, stopping the flow of water from the reservoir.

9. The method of providing root-controlled, on-demand watering of plants of claim 5, wherein, when all the water is exhausted from the reservoir, the counterweight pivots the reservoir back into a generally horizontal plane pinching shut the air hose and opening the water hose to permit supply water to replenish the reservoir, which reservoir, when filled, will pivot into a vertical, water-dispensing position to allow water to escape from the reservoir when air in the soil is permitted to rise through the hollow air tube and air hose into the reservoir.

References Cited

UNITED STATES PATENTS

| 2,445,717 | 7/1948 | Richards | 239—63 |
| 2,893,641 | 7/1956 | Hunter | 239—64 |
| 3,125,255 | 3/1964 | Kaiser | 239—63 |

EVERETT W. KIRBY, *Primary Examiner.*

U.S. Cl. X.R.

239—63